E. W. H. Cooper,
Cutter Holder,
N° 64,491.  Patented May. 7, 1867.
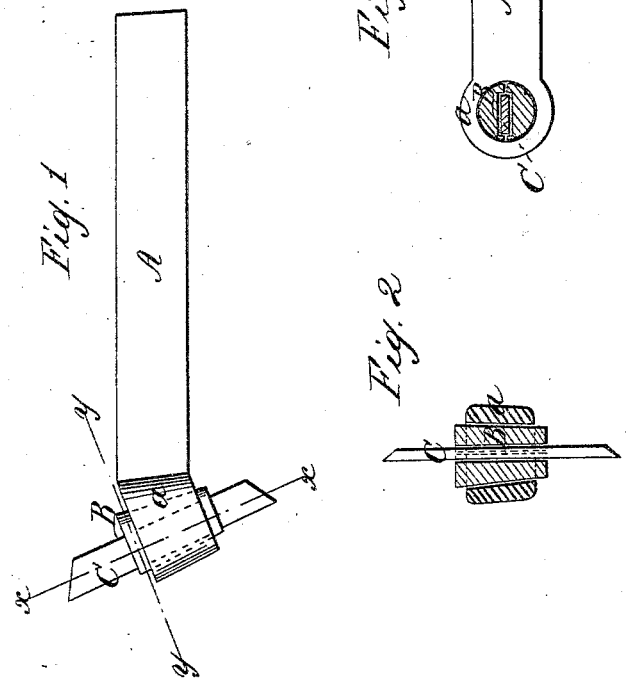
Witnesses
Theo Tusch
J. A. Service
Inventor
Edwin W. H. Cooper
Per Munn & Co
Attorneys.

United States Patent Office.

EDWIN W. H. COOPER, OF HARTFORD, CONNECTICUT.

Letters Patent No. 64,494, dated May 7, 1867.

IMPROVED TOOL-HOLDER.

*The Schedule referred to in these Letters Patent and making part of the same.*

TO ALL WHOM IT MAY CONCERN:

Be it known that I, EDWIN W. H. COOPER, of Hartford, in the county of Hartford, and State of Connecticut, have invented a new and improved Tool-Holder; and I do hereby declare that the following is a full, clear, and exact description thereof, which will enable others skilled in the art to make and use the same, reference being had to the accompanying drawings, forming part of this specification, in which—

Figure 1 represents a side elevation of this invention.

Figure 2 is a transverse section of the same, the plane of section being indicated by the line $x\ x$, fig. 1.

Figure 3 is a horizontal section of the same, taken in the plane indicated by the line $y\ y$, fig. 1.

Similar letters of reference indicate like parts.

This invention relates to a tool-holder for turning-lathes, planers, or other machinery, said tool-holder being provided with a conical socket, intended to receive a split or segmental chuck, into which the tool is inserted in such a manner that when the tool is placed between the jaws of the chuck, and the chuck is inserted in the conical socket, by the action of said socket the chuck is made to clasp the tool tight, and, as the work of turning or planing proceeds, the tool is pushed in tighter and tighter, and all danger of its getting loose accidentally is avoided. By these means a small quantity of steel is required to make the tools, and by preparing chucks with different openings, tools of various shapes can be inserted in one and the same tool-holder.

A represents a tool-holder, the shank of which is of a square or rectangular cross-section, and of such a shape that it can be conveniently inserted in the tool-post of a turning-lathe, planing machine, slotting machine, or of any other machine used for cutting or turning metals or other materials. Said tool-holder is provided at the outer end of its shank with a socket, $a$, which is bored out tapering, and which may be placed at any convenient angle with the shank, as shown in fig. 1 of the drawing. Into this socket is fitted the chuck B, which is composed of two or more jaws, or which may be simply split. This chuck is provided with an aperture or mortise, which passes through it from end to end, and which is made of such a size and shape that it is capable of receiving the tool, which may be flat, square, polygonal, round, or of any desired form or shape.

When the tool C is placed between the jaws of the chuck, said jaws do not come close together, and, by inserting the chuck in the conical socket, its jaws are compressed, and it is made to clamp and hold the tool tightly. By placing the socket $a$ in an oblique position towards the shank of the tool-holder, the tool receives the required dip.

In order to be able to use tools of different shape, chucks with openings of different shape must be provided, and if the tool is to be changed, the chuck, together with the old tool, is removed, and a new chuck containing the required tool is inserted, and by these means the same tool-holder can be used for all the tools to be employed. The tools can be made of short and comparatively small pieces of steel. They are easily forged, readily ground, and they can be used up so as to leave but little waste.

What I claim as new, and desire to secure by Letters Patent, is—

The chuck B, either sectional or split, in combination with the conical socket $a$ in the tool-holder A, constructed and operating substantially as and for the purpose set forth.

EDWIN W. H. COOPER.

Witnesses:
SAMUEL F. JONES,
ROGER WELLES.